United States Patent

Psaar

[11] 3,992,140
[45] Nov. 16, 1976

[54] PRINTING INKS FOR TRANSFER PRINTING

[75] Inventor: Hubertus Psaar, Leverkusen, Germany

[73] Assignee: Bayer Aktiengesellschaft, Leverkusen, Germany

[22] Filed: May 10, 1974

[21] Appl. No.: 468,673

[30] Foreign Application Priority Data

May 18, 1973   Germany.............................. 2325154

[52] U.S. Cl. .................................. 8/2.5 A; 8/168 C
[51] Int. Cl.² .......................................... D06P 1/645
[58] Field of Search ............................ 8/2.5, 168 C

[56] References Cited
UNITED STATES PATENTS

| | | | |
|---|---|---|---|
| 2,755,200 | 7/1956 | Balon et al. | 117/36 |
| 2,893,816 | 7/1959 | Tsang et al. | 8/55 |
| 2,911,280 | 11/1959 | Cicogna | 8/2.5 |
| 3,048,565 | 8/1962 | Gall et al. | 260/75 |
| 3,642,823 | 2/1972 | Raue et al. | 260/326.15 |

FOREIGN PATENTS OR APPLICATIONS

| | | |
|---|---|---|
| 1,352,316 | 5/1974 | United Kingdom |
| 951,987 | 3/1964 | United Kingdom ............... 8/2.5 UX |
| 1,211,149 | 11/1970 | United Kingdom ............... 8/2.5 UX |

*Primary Examiner*—Joseph L. Schofer
*Assistant Examiner*—A. L. Clingman
*Attorney, Agent, or Firm*—Plumley and Tyner

[57] ABSTRACT

Printing inks for the production of auxiliary carriers for transfer printing on acid-modified textile fiber materials, characterized in that they contain at least a. as a dyestuff intermediate, a carbinol base of cationic dyestuffs, which can be sublimed at 160-240° C, of the formula

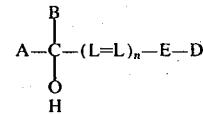

wherein
  A, B and D represent an aryl or heteryl radical,
  B can also denote hydrogen or can, conjointly with A, form the remaining members of a heterocyclic ring system,
  E represents a direct bond or a >N-alkyl group,
  L represents a methine group which is optionally substituted by alkyl, nitrile or alkoxycarbonyl or represents a N atom and
  n denotes the numbers 0 or 1,
b. a practically anhydrous neutral organic solvent and
c. a neutral resin which is soluble in this solvent.

3 Claims, No Drawings

PRINTING INKS FOR TRANSFER PRINTING

The invention relates to new printing inks for the production of auxiliary carriers for transfer printing on acid-modified textile fibre materials.

These inks are characterised in that they contain at least a. as a dyestuff intermediate, a carbinol base of cationic dyestuffs, which can be sublimed at 160°–240° C, of the formula

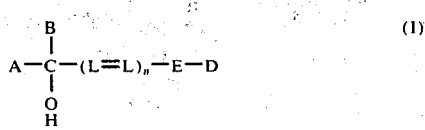

wherein
- A, B and D represent an aryl or heteryl radical,
- B can also denote hydrogen or can, conjointly with A, form the remaining members of a heterocyclic ring system,
- E represents a direct bond or a >N-alkyl group,
- L represents a methine group which is optionally substituted by alkyl, nitrile or alkoxycarbonyl or represents a N atom and
- n denotes the numbers 0 or 1, b. a practically anhydrous neutral organic solvent and
c. a neutral resin which is soluble in this solvent.

By "transfer printing" there is understood a recent dyeing and printing process which is characterised in that the dyestuffs are transferred by the action of heat and optionally of pressure from an auxiliary carrier, printed with special printing inks, onto the substrate which is to be printed, that is to say are in general transferred by sublimation. (Compare, for example, French Pat. Nos. 1,223,330 and 1,334,829). Hitherto, as a rule, readily sublimable disperse dyestuffs have been employed for this purpose, and polyester fibre materials have preferably been employed as substrates.

The dyestuffs used in the inks according to the invention, on the other hand, are preferentially suitable for printing of textile fibre materials which can be dyed with basic dyestuffs.

As in the customary transfer process, the auxiliary carriers used are preferably paper, but also cellophane, cellulose textiles, metal foils and the like.

In the dyestuffs of the formula I required for the new printing inks, the aryl radicals A, B and D represent naphthyl radicals and preferably phenyl radicals of which at least one carries an amino, alkylamino, dialkylamino, arylamino, arylalkylamino, alkoxy or aralkoxy substituent in the 4-position to the central C atom. In addition, these radicals can contain further non-ionic substituents customary in dyestuff chemistry, such as nitro, halogen, alkyl, cycloalkyl, hydroxyl, alkoxy, aralkoxy, cycloalkoxy, aryloxy, acyloxy, acyl, alkoxycarbonyl, amidocarbonyl, nitrile, amino, alkylamino, dialkylamino, acylamino, mercapto, alkylmercapto and arylmercapto groups, with "acyl" in general being intended to mean alkylcarbonyl or arylcarbonyl.

Suitable heteryl radicals A, B and D are radicals of the following heterocyclic compounds: indole, indoline, thiazole, benzthiazole, imidazole, benzimidazole, 1,2,4-triazole, indazole, pyrazole, pyridine, quinoline, pyrimidine, quinoxaline, pyrane, benzo(b)-pyrane and benz(cd)-indole.

These radicals can also be substituted further in the usual manner by non-ionic substituents such as, for example, alkyl, cycloalkyl, aryl, halogen and alkoxy.

Suitable heterocyclic structures which A and B can form conjointly with the central C atom in compounds of the formula I are:

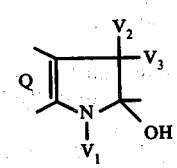 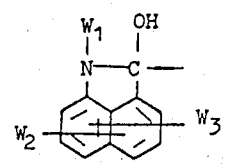

and

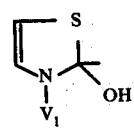

wherein
- Q is a fused arylene radical and
- $V_1$, $V_2$, $V_3$, $W_1$, $W_2$ and $W_3$ are substituents customary for these types of dyestuff, such as, for example, H, alkyl, halogen and others.

By the alkyl radicals mentioned above in any context there are to be understood saturated and unsaturated alkyl radicals which preferably contain 1–4 C atoms and can optionally be substituted, preferably monosubstituted, by halogen, OH, CN, alkoxy, phenyl and the like. As examples there may be mentioned: methyl, ethyl, propyl, butyl, vinyl, allyl and cyanoethyl. By the aryl radicals mentioned above in any context there are above all to be understood, unless otherwise defined, phenyl radicals which can be substituted, preferably monosubstituted, bisubstituted or trisubstituted, by halogen, $C_1$–$C_4$-alkyl or $C_1$–$C_4$-alkoxy.

The abovementioned cycloalkyl radicals are preferably cyclopentyl and cyclohexyl radicals which can be substituted, for example by halogen or $C_1$–$C_4$-alkyl.

The alkoxy radicals mentioned above in any context preferably have 1–4 C atoms.

The dyestuff intermediates to be used according to the invention are known or are easily obtainable according to known processes.

They are either synthesised directly (compare, for example A 354,201) or are liberated from the corresponding dyestuff salts in a known manner, for example by the action of sodium hydroxide solution.

The dyestuff salts, in turn, are also largely known. Suitable dyestuff salts for the preparation of the compounds to be used according to the invention are 1. diarylmethane and triarylmethane dyestuffs, such as are described in Colour Index (for example C.I. Basic Blue 1, C.I. Basic Blue 5 and C.I. Basic Green 4) or in the more recent patent literature (for example German Offenlegungsschriften (German Published Specifications) Nos. 1,811,337, 1,811,338, 1,811,651 and 1,811,652).

2. Indolylarylmethane dyestuffs, such as are described, for example, in German Offenlegungsschrift (German Published Specification) No. 1,569,742.

3. Cyanine dyestuffs, such as are described, say, in the Colour Index, for example C.I. Basic Violet 16 and C.I. Basic Orange 22.

4. Azacyanine dyestuffs, such as are described, say, in German Patent Specifications Nos. 1,083,000, 1,150,475 and 1,150,476 as well as 1,163,775.
5. Cyanine dyestuffs which are derived from naphtholactam derivatives, such as, for example, those of German Patent Specifications Nos. 1,170,569, 1,184,882, 1,190,126, 1,190,126b, 1,287,004 and 1,225,325.
6. Benzo-(b)-pyrane dyestuffs such as are described, say, in Helv. 34, 1772 (1951) and Teintex No. 8–9, 459 (1972).

Particularly suitable dyestuff intermediates are those of the formulae a) 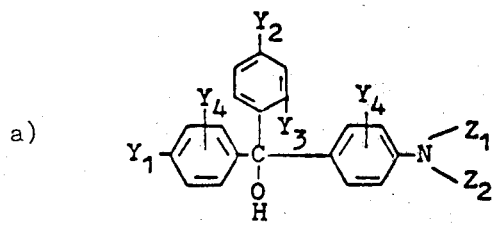

wherein
$Z_1$ and $Z_2$ denote hydrogen or $C_1$–$C_4$-alkyl,
$Y_1$ denotes amino, $C_1$–$C_4$-alkylamino, $C_2$–$C_4$-dialkylamino or $C_4$–$C_4$-alkoxy,
$Y_2$ denotes $Y_1$ or H and
$Y_3$ and $Y_4$ denote H, methyl and/or chlorine.
(Those with $Y_1 = OCH_3$; $Y_4 = H$ and $Y_3 = Cl$ or $CH_3$ are very particularly preferred.)

b) 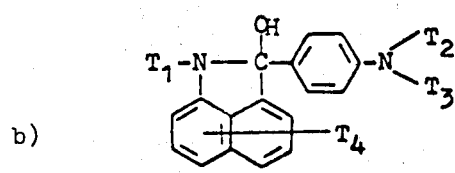

wherein
$T_1$ denotes methyl, ethyl, n-propyl, n-butyl or cyanoethyl,
$T_2$ denotes methyl or ethyl,
$T_3$ denotes $T_2$ or H and
$T_4$ denotes H, Br or Cl.

c) 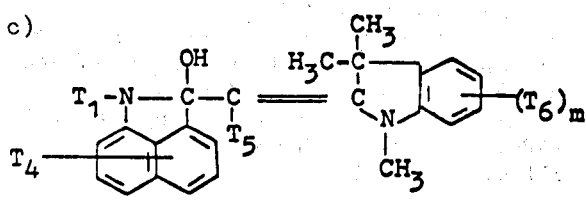

wherein
$T_1$ and $T_4$ have the meaning mentioned and
$T_5$ denotes H or CN,
$T_6$ denotes H, $CH_3$, $OCH_3$, $NO_2$, Cl, $COOCH_3$ or $COOC_2H_5$ and
$m$ denotes 1 or 2.

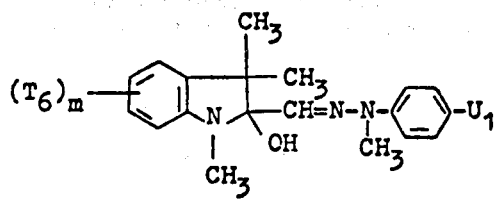

d)

wherein
$T_6$ and $m$ have the meaning mentioned and
$U_1$ represents $C_1$–$C_4$-alkyl, $C_1$–$C_4$-alkoxy or $C_2$–$C_5$-alkylcarbonylamino.

The dyestuff intermediates to be used according to the invention can be employed both in the pure, undiluted, pulverulent form (so-called uncut material) and also in the form of a preparation. A suitable method for producing a preparation is in particular the process described in German Offenlegungsschrift (German Published Specification) No. 1,469,724, in which the dyestuff is kneaded with a resin which does not soften below 120° C, a non-ionic dispersing agent and optionally an antioxidant, and the resulting granules are ground.

In the printing inks according to the invention, the dyestuff is generally in the form of a solution.

Suitable solvents are neutral solvents, that is to say solvents which do not react chemically with the dyestuff intermediates, namely: hydrocarbons such as benzene, toluene and xylene; chlorinated hydrocarbons such as chlorobenzene, ethylene chloride, trichloroethylene and tetrachloroethylene; alcohols such as methanol, ethanol, isopropanol, butanol and benzyl alcohol, ketones such as methyl ethyl ketone and cyclohexanone, and various ethers and esters. They are used in the pure form or as mixtures. Preferred solvents are the hydrocarbons mentioned, and amongst these toluene, in turn, is preferred.

To prepare the new printing inks it is possible in principle to employ, as resins, the same types as are used for the preparation of transfer printing inks based on disperse dyestuffs, provided the resins react neutral, because of the sensitivity to acid and alkali of the dyestuffs to be used according to the invention. Examples of suitable resins are ketone resins, such as, say, Kunstharz AFS(R) and cellulose ethers, such as, say, ethylcellulose.

To improve the sharpness of contour of the prints produced according to the invention it is possible optionally to coat the auxiliary carriers, printed with the new printing inks, with a colourless layer of binder or resin, in accordance with the instructions of German Offenlegungsschrift (German Published Specification) No. 101,910.

Suitable substrates which take up the dyestuff during the transfer printing process are — as already mentioned — usual materials which can be dyed with basic dyestuffs, for example materials of polyacrylonitrile, of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, and of acid-modified synthetic materials, especially of acid-modified aromatic polyesters and acid-modified polyamide fibres. Acid-modified aromatic polyesters are, for example, polycondensation products of sulphoterephthalic acid and ethylene glycol, that is to say polyethylene glycol terephthalates containing sulphonic acid groups (type DACRON 64 of E. I. DuPont de Nemours and Company), as are described in Belgian Pat. No. 549,179 and U.S. Pat. No. 2,893,816.

The dyestuff transfer is effected at temperatures of 160° to 240° C, preferably 200° to 220° C, over the course of 15 to 60 seconds.

The heat transfer can be effected by direct contact with heating plates, or by hot air, hot steam or infrared radiation. Dyeings and prints which display good fastness properties in use are obtained on the materials used as substrates.

EXAMPLE 1

20 g of a carbinol base of the formula

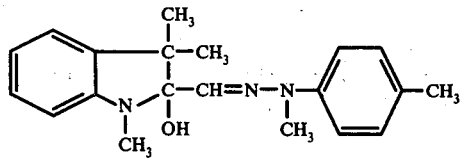

are ground with 0–7.5 g of a cyclohexanone-formaldehyde resin of softening point above 160° C and 10–2.5 g of ethylcellulose $N_4$ in a pearl mill. 100 parts of a printing ink are prepared by addition of toluene containing 10% of polywaxes. A paper is impregnated with this printing ink, using a spray gun. If this paper is pressed against a textile of polyacrylonitrile fibres for 15–30 seconds at 180° C, a yellow print having good fastness properties is obtained. If a textile of acid-modified polyester fibres (Dacron 64) is used, a strong yellow dyeing is again obtained.

EXAMPLE 2

20 g of the carbinol base of the formula

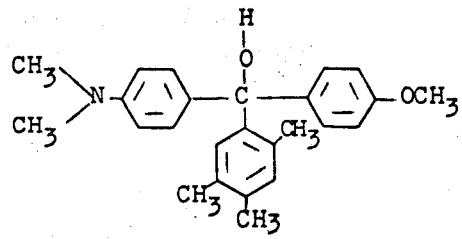

are dissolved in 800 g of toluene containing 10% of polywaxes. A paper is impregnated with this solution and dried. If this paper is pressed against a fabric of polyacrylonitrile fibres, a red dyeing with good fastness properties is obtained.

EXAMPLE 3

20 g of the carbinol base of the formula

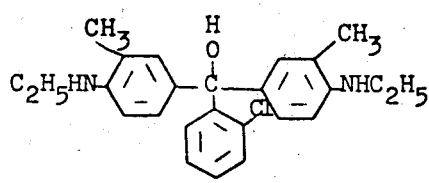

are converted to a printing ink as in Example 2. An aluminium foil is impregnated with this printing ink, using a spray gun. If this foil is pressed against a fabric of polyacrylonitrile fibres for 15–40 seconds at 180° C, a clear blue print is obtained. If a textile of acid-modified polyamide is used, a blue print is again obtained.

If, instead of the dyestuff intermediates employed in Examples 1–3, the carbinol bases indicated by formulae in the table which follows are used to prepare printing inks, an auxiliary carrier printed therewith gives transfer prints of the colour shades indicated in the last column on acid-modified textile fibre materials, for example of polyacrylonitrile.

| Example | Formula | Colour shade |
| --- | --- | --- |
| 4 | ![formula] | green |
| 5 | ![formula] | blue |
| 6 | ![formula] | blue |

| Example | Formula | Colour shade |
|---|---|---|
| 7 | 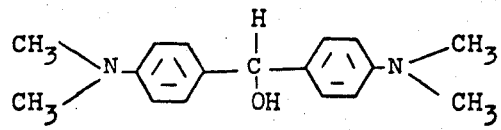 | blue |
| 8 | 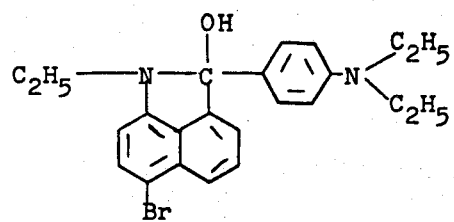 | reddish-tinged blue |
| 9 | 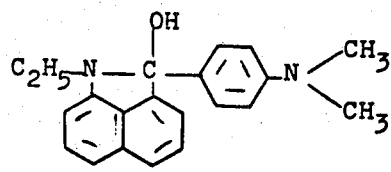 | reddish-tinged blue |
| 10 | 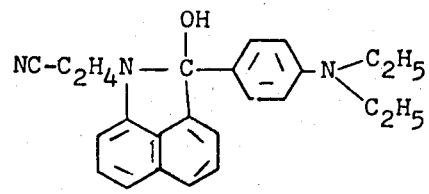 | reddish-tinged blue |
| 11 | 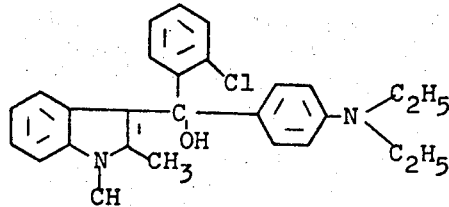 | blue |
| 12 | 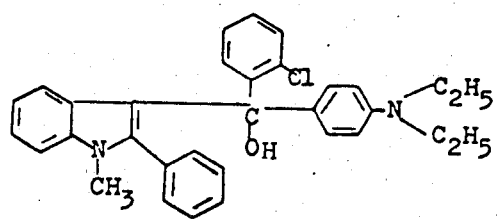 | blue |
| 13 | 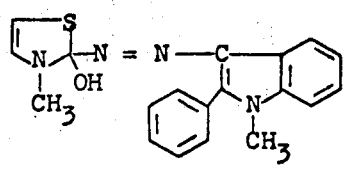 | red |
| 14 | 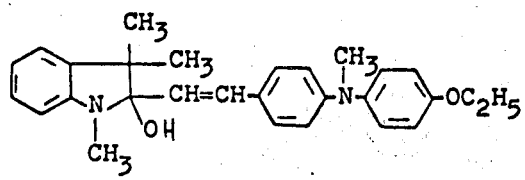 | bluish-tinged red |

| Example | Formula | Colour shade |
|---|---|---|
| 15 | 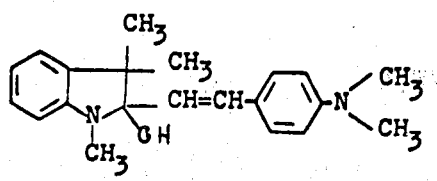 | bluish-tinged red |
| 16 | 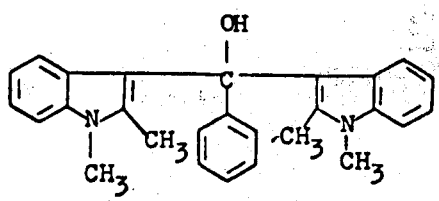 | red |
| 17 | 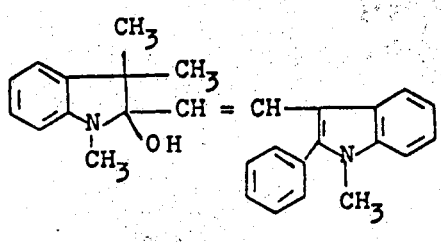 | orange |
| 18 | 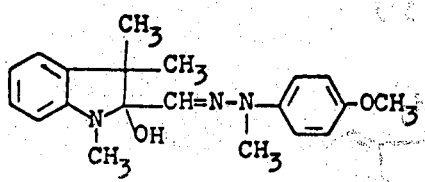 | golden yellow |
| 19 | 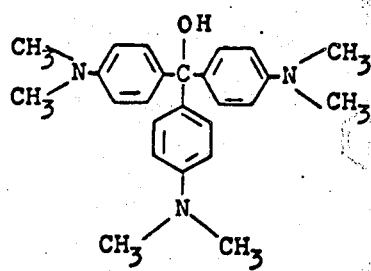 | violet |
| 20 | 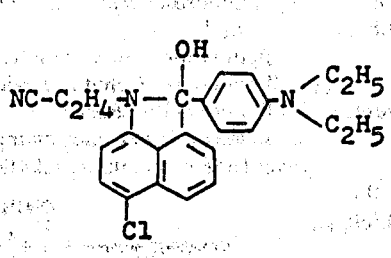 | blue |
| 21 | 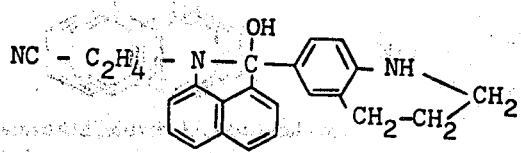 | blue |

| Example | Formula | Colour shade |
|---|---|---|
| 22 | 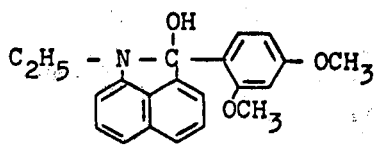 | orange |
| 23 | 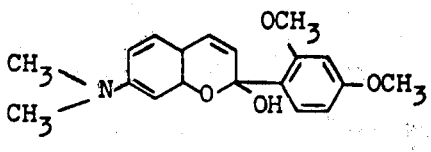 | red |
| 24 | 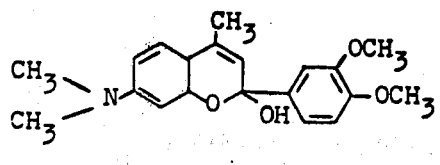 | red |
| 25 | 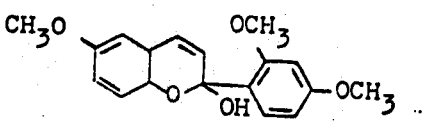 | orange |
| 26 | 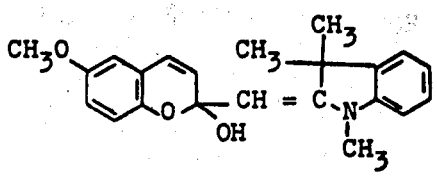 | orange |
| 27 | 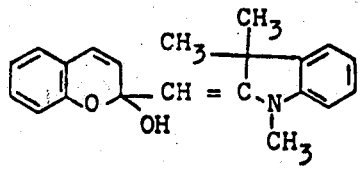 | orange |

I claim as my invention:

1. Printing inks for the preparation of auxiliary carriers for transfer printing on acid-modified textile fiber materials comprising
  1. a sublimable dyestuff intermediate,
  2. a practically anhydrous neutral organic solvent, and
  3. a neutral resin soluble in said solvent;
the improvement which comprises employing as the sublimable dyestuff intermediate a carbinol base which sublimes at 160°–240° C and has the formula:

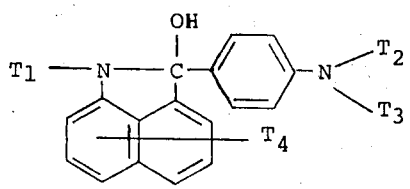

wherein
  $T_1$ denotes methyl, ethyl, n-propyl, n-butyl, or cyanoethyl;
  $T_2$ denotes methyl or ethyl;
  $T_3$ denotes H, methyl, or ethyl; and
  $T_4$ denotes H, Br, or Cl.

2. Printing inks according to claim 1 wherein the dyestuff intermediate has the formula

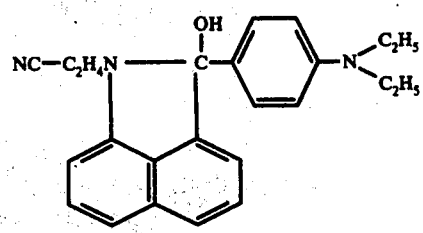

3. Acid-modified textile fibre materials printed by means of auxiliary carriers according to claim 1.

* * * * *